Sept. 13, 1938.    V. A. BERGHOEFER    2,129,986

STEAM TRAP

Filed Oct. 24, 1935

INVENTOR.
VICTOR A. BERGHOEFER
BY
*Wesley Merrick*
ATTORNEY.

Patented Sept. 13, 1938

2,129,986

UNITED STATES PATENT OFFICE 2,129,986

STEAM TRAP

Victor A. Berghoefer, Milwaukee, Wis., assignor to Sterling Engineering Company, Milwaukee, Wis., a corporation of Wisconsin Application October 24, 1935, Serial No. 46,467

2 Claims. (Cl. 236—58)

This invention relates to steam traps of the type which permits the escape of condensate from radiators and the like but prevents the escape of steam or vapor therefrom.

The steam trap to which the invention applies in particular has a thermostatic diaphragm or bellows arranged within a casing and adapted to move a valve into and out of engagement with a valve seat in response to variations in the temperature prevailing within the casing.

The invention has as an object to provide a steam trap having a valve which is self-centering in respect to the valve seat.

Another object is to provide a steam trap which is positive and precise in operation.

Another object is to provide a thermostatic steam trap which will operate over a long period of time without repairs or adjustments being made thereto.

Other objects and advantages will appear from the description hereinafter given of a steam trap in which the invention is embodied.

According to the invention in its general aspect and as ordinarily embodied in practice, the steam trap has its valve fastened to a thermostatic diaphragm or bellows by a slidable joint which permits the valve to move laterally and thereby aline itself with the valve seat, and means are provided for retaining the valve in adjusted position in respect to its seat after it has been moved out of contact therewith by contraction of the diaphragm or bellows.

The invention is exemplified by the steam trap shown somewhat diagrammatically in the accompanying drawing in which the views are as follows.

Figure 1:
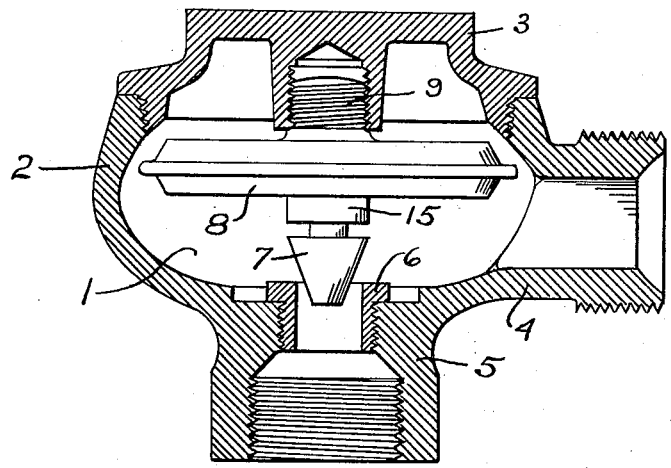
Fig. 1 is a central vertical section through the steam trap with the expansion member and the valve shown in elevation.
Figure 2:
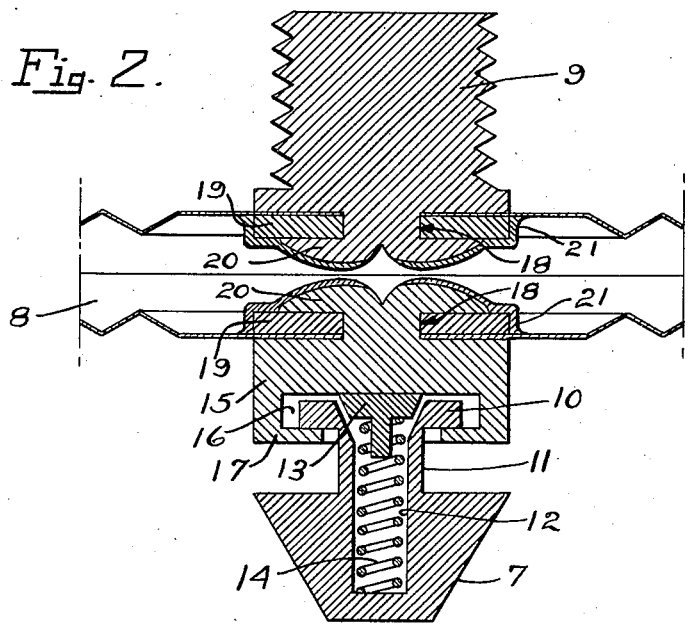
Fig. 2 is a central vertical section through the valve and a part of the expansion member.

The steam trap has its mechanism arranged within a chamber 1 which is formed in a casing 2 and closed at its top by a cap 3. The casing 2 is provided at one side with an inlet 4 and at its bottom with an outlet 5 which has an annular valve seat 6 arranged at the upper end thereof. The inlet and the outlet are provided with suitable means, such as threads, for connecting the steam trap into a heating circuit.

The flow of fluid through the chamber 1 is controlled by a conical valve 7 which is carried by a thermostatic diaphragm or expansion member 8 and adapted to be moved thereby into and out of engagement with the valve seat 6. The expansion member 8 is fixed to the cap 3 by means of a stud 9.

The valve 7 has an annular flange 10 arranged at its upper end, a stem 11 connecting the flange 10 to the conical part of the valve, and an axial bore 12 extending part way through the valve from the upper end thereof.

The bore 12 has a friction block 13 arranged in the upper end thereof and a helical compression spring 14 arranged therein between the friction block and the bottom of the bore to urge the friction block upward against a connector 15 by means of which the valve is attached to the expansion member 8. The connector 15 is made of a suitable metal, such as brass, which may be formed by pressure into a desired shape and which has sufficient strength to retain that shape under all conditions of operation of the steam trap.

The flange 10 is arranged within a circular recess 16 which is formed in the lower end of the connector 15 and is greater in diameter than the flange 10 to permit the valve to have a limited lateral movement in respect to the connector 15. The valve is retained in position by means of an annular flange 17 which is arranged around the recess 16 upon the lower end of the connector 15 and is in engagement with the underside of the flange 10.

In manufacturing the valve assembly, the friction block 13 and the spring 14 are arranged in the bore 12, a bore of the diameter of the recess 16 is formed in the lower end of the connector 15 and the flange 10 is inserted therein, and then the lower part of the wall of this bore is turned inward against the underside of the flange 10 to form the annular flange 17. In the drawing, the clearances are somewhat exaggerated for clearness of illustration.

The connector 15 is provided at its upper end with an integral cylindrical projection 18 which is inserted through a hole formed in the lower wall of the expansion member 8 at the center thereof, then a ring 19 is placed over the projection 18 and in contact with the lower wall of the expansion member, and then the upper part of the projection 18 is rolled or otherwise expanded over the ring 19 to form a head 20 which is pressed against the ring 19 with sufficient force to set up an internal stress in the metal and thereby cause the ring 19 and the wall of the expansion member 8 to be squeezed between the head 20 and the body of the connector 15.

The joint thus produced is steam and gas tight but, as an added precaution against possible leakage, a thin layer 21 of solder is spread over the head 20, the ring 19 and an adjacent portion of the lower wall of the expansion member 8.

The stud 9 is fastened to the upper part of the expansion member 8 in the same manner that the connector 15 is fastened to the lower part thereof. Consequently, like parts have been indicated by like reference numerals.

After the stud 9 and the valve assembly have been fastened in position as above described, the upper and the lower parts of the expansion member are fastened together at the outer edges thereof, then the expansion member is filled with a suitable expansible liquid or gas, then the stud 9 is screwed into the cap 3, and then the cap 3 is fixed in position as by being threaded into the body of the casing 2, thereby completing the assembly of the steam trap.

The method of fastening the stud 9 and the valve assembly to the expansion member provides a joint which is not dependent upon solder for rigidity and which will not break down in service due to fatigue of materials.

The spring 14 permits the valve 7 to aline itself with the valve seat 6 the first time the trap closes and then prevents it from being tilted or shaken out of its adjusted position by subsequent expansion and contraction of the expansible member 8.

The lateral adjustment of the valve insures perfect centering of the valve cone with the valve seat and keeps the axis of the cone perpendicular to the plane of the seat, thereby providing a perfect steam tight contact between the valve and the seat when the trap closes and eliminating all possibility of wear due to eccentric rubbing action.

The steam trap herein described is susceptible of various modifications without departing from the scope of the invention as hereafter claimed.

The invention is hereby claimed as follows:

1. In a thermostatic valve, the combination of a temperature responsive member, a connector fastened to said member and having a recess therein, a valve member having a stem fixed at one of its ends thereto, a flange fixed to the other end of said stem and arranged within said recess, a flange formed integral with said connector and extending around said recess and said stem to fasten said valve member to said connector, a spring arranged within said valve member and reacting against said connector for holding the flange on said stem against the flange on said connector, and a friction block arranged between said spring and the end of said recess.

2. In a thermostatic valve, the combination of a temperature responsive member, a connector fastened to said member and having a recess therein, a valve member having a stem fixed at one of its ends thereto, a circular flange smaller in diameter than said recess fixed to the other end of said stem and arranged within said recess, an annular flange formed integral with said connector and extending around said recess and said stem to fasten said valve member to said connector but permitting said circular flange to have a limited radial movement within said recess, a spring arranged within said valve member and reacting against said connector for holding the flange on said stem against the flange on said connector, and a friction block arranged between said spring and the end of said recess.

V. A. BERGHOEFER.